United States Patent

[11] 3,610,982

[72] Inventor Bernhard Rall
Ulm (Danube), Germany
[21] Appl. No. 32,965
[22] Filed Apr. 29, 1970
[45] Patented Oct. 5, 1971
[73] Assignee Licentia Patent-Verwaltungs-GmbH
Frankfurt, Germany
[32] Priority Apr. 30, 1969
[33] Germany
[31] P 19 22 072.5

[54] QUATERNARY PHASE DIFFERENCE SIGN DETERMINING DEVICE
4 Claims, 2 Drawing Figs.

[52] U.S. Cl. .......... 307/232, 307/215, 328/109, 328/118, 328/133
[51] Int. Cl. .......... H03k 5/20
[50] Field of Search .......... 307/232, 233, 215; 328/109, 110, 118, 133

[56] References Cited

UNITED STATES PATENTS

| | | | |
|---|---|---|---|
| 3,286,176 | 11/1966 | Birnboim | 307/232 |
| 3,354,398 | 11/1967 | Broadhead | 307/233 |
| 3,430,148 | 2/1969 | Miki | 307/215 |

*Primary Examiner*—Donald D. Forrer
*Assistant Examiner*—R. E. Hart
*Attorney*—Spencer & Kaye

ABSTRACT: A device which interprets the sign components of pairs of consecutive pulses which have been demodulated from pulse data transmitted with quaternary phase difference keying, the device employing a pair of flip-flops with preliminary memory whose outputs are connected to a second pair of similar flip-flops. For each pair of consecutive pulses, NOR gates are used to determine the coincidence or lack of coincidence of the sign components of the pair of pulses and further NOR gates are used to determine the coincidence or lack of coincidence of the sign components of the first of the pulse pair. The second set of NOR gates controls a device which determines the sequence of transmission of the bits determined by the first set of NOR gates, thus clearly identifying and transmitting the binary word according to the phase difference.

PATENTED OCT 5 1971 3,610,982

Inventor:
Bernhard Rall
BY Spencer & Kaye
ATTORNEYS.

QUATERNARY PHASE DIFFERENCE SIGN DETERMINING DEVICE

BACKGROUND OF THE INVENTION

Certain advantages accrue from the transmission of binary data by phase keying and, in particular, the use of four-phase positions has proven advantageous in the transmission of binary data wherein the phase difference is established not with respect to a fixed carrier or reference, but by the phase difference between pairs of consecutive pulses. In such systems determination of the phase difference required is established at the transmitted end whereas retrieval of the data at the receiving end requires interpretation of the phase difference.

Thus, if the binary words 11, 01, 00 and 10 respectively are assigned to the four quadrants of the phase plane, demodulation of each pulse will identify the phase quadrant to which it belongs by the signs, or polarities, of its $x$ and $y$ components. However, since the data is being transmitted as a phase difference between two consecutive pulses, it is necessary to compare these pulses to establish the precise phase quadrant to which the transmitted data belongs. For example, assume that the first of any consecutive pair of pulses belongs to the second quadrant (i.e., sign of $y$ is minus, sign of $x$ is plus) and the next pulse is also in the second quadrant, the data transmitted is that belonging to the first quadrant, i.e., the binary word 11 since no phase difference is established between the two pulses.

In German Patent 1,222,103, the demodulated components of each pulse, the pulses representing, respectively, the polarity of $y$ and the polarity of $x$ and being referred to hereinafter as sign $y$ and sign $x$, at the receiver are fed to the inputs of a first pair of bistable flip-flops whose outputs are connected to the inputs of a second pair of flip-flops by circuitry such that equality of the outputs of the corresponding flip-flops of the first and second pairs of flip-flops causes the logic "one" to be written, and vice versa, the transmission of the data given by the two components occurring consecutively such that the transmission at inequality of the components in the second pair of flip-flops is reversed with respect to the sequence at equality of these components.

This arrangement involves the use of controllable bipolar dynamic transfer members between the two pairs of flip-flops, in which the sequence of the transmission data is dependent upon the switching state of a bistable flip-flop controlled by an antivalence circuit which checks the second pair of flip-flops for coincidence of their switching states.

SUMMARY OF THE INVENTION

The present invention is directed to logic circuitry for determining the binary data transmitted in the fashion described above from the demodulated components of consecutive pulses. More specifically, the invention involves the use of integrated circuits employing J–K flip-flops so as to perform the necessary logic while obtaining the dependability of integrated circuits.

Specifically, two pairs of J–K flip-flops are employed into the first pair of which the respective $x$ and $y$ polarity components are written, clock pulses being used to step these inputs to the Q and $\overline{Q}$ outputs of such first pair which then constitute the inputs to the second pair of J–K flip-flops. A first gating circuitry determines the coincidence or lack thereof between the outputs of the first and second pair of flip-flops while a second gating circuitry determines the coincidence or lack thereof at the outputs of the second pair of flip-flops. For coincidence as determined by the second gating circuitry, the sequence established by the first gating circuitry is transmitted in reverse sense to the sequence transmitted upon determination of noncoincidence by the second gating circuitry.

This arrangement allows a saving in space and, because of the use of the clock pulse-controlled preliminary storage in the J–K flip-flops, allows the demodulating phase difference computer to exhibit reduced sensitivity and increased dependability Moreover, as compared to the system described above, the antivalence circuit and its flip-flop are eliminated.

DESCRIPTION OF THE PREFERRED EMBODIMENTS

In a system with which the device according to the invention is used, a phase difference computer (not shown) demodulates each pulse received to the signs of its $x$ and $y$ components and these components are applied to the preliminary memories of a first pair of J–K flip-flops S1 and S2. For example, if the sign of $y$ is +, a binary "1" is applied to input 10 while if the sign of $y$ is −, a binary "0" is applied. The same relationship exists between the sign of the x component and the signal applied to input 14. The demodulated sign $y$ component is applied at conductor 10 to the J input of the flip-flop S2 and simultaneously, this signal is inverted at 12 and applied to the K input of the flip-flop S2. Similarly, the sign $x$ component is applied to the J input of the flip-flop S1 at conductor 14 and this signal is inverted at 16 and applied to the K input of this flip-flop.

Figure 1:
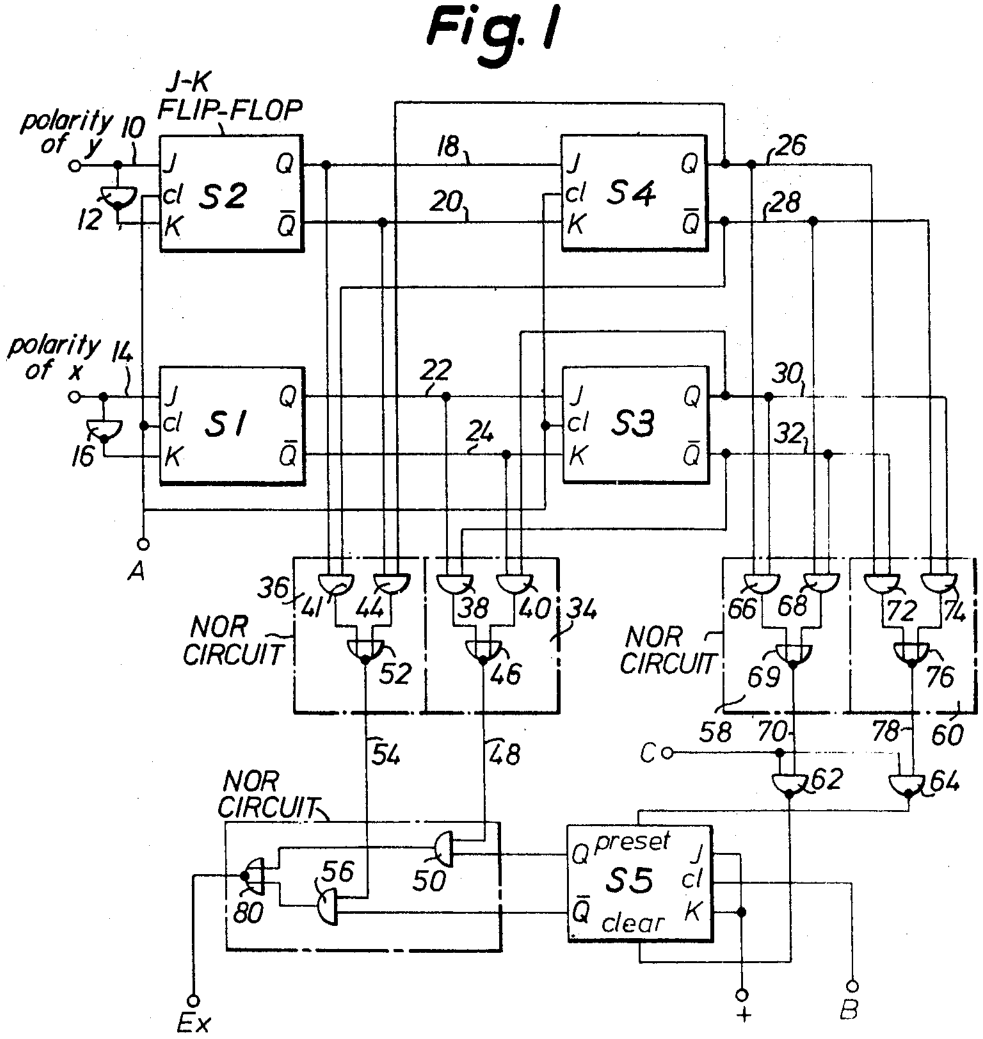
FIG 1. is a block diagram illustrating the circuit arrangement according to the invention.
Figure 2:
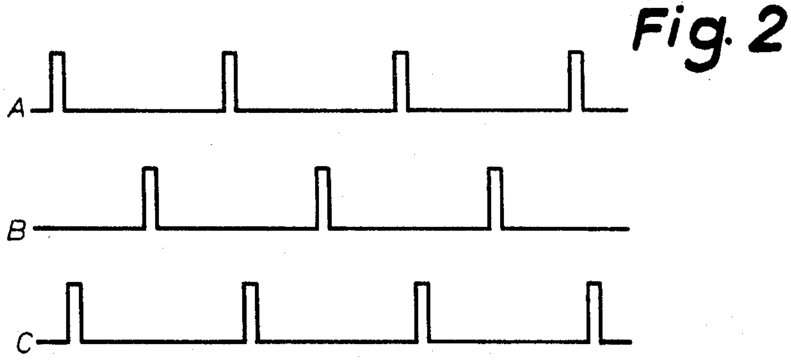
FIG. 2 is a time diagram of the clock pulses appearing in the circuit of FIG. 1.

Clock pulses at the terminal A, corresponding to the time diagram of FIG. 2, are applied at the clock pulse inputs of both the flip-flops S1 and S2 as well as the further J–K flip-flops S3 and S4. Thus, upon arrival of a clock pulse A, the sign components written into the preliminary memories of the two flip-flops S1 and S2 appear at their Q and $\overline{Q}$ outputs as static signals which simultaneously are written into the preliminary memories of the flip-flops S3 and S4. At the same time, the previous outputs of the flip-flops S1 and S2 which had been written into the preliminary memories of the flip-flops S3 and S4 appear at the outputs of the latter. For clarity, the conductors 18, 20, 22, 24, 26, 28, 30 and 32 are identified in FIG. 1.

Two gating NOR circuits 34 and 36 are employed to determine the coincidence, or noncoincidence, of the $x$ and $y$ sign components of consecutive pulses. The gating circuit 34 includes an AND gate 38 connected to the conductors 22 and 32 so that, upon coincidence of the sign $x$ components of consecutive pulses, this gate is blocked. Similarly, the AND gate 40 is blocked upon coincidence of the sign $x$ components of consecutive pulses. In similar fashion, the AND gates 42 and 44 are employed for the sign $y$ components of consecutive pulses.

To appreciate the significance of the NOR circuits 34 and 36, assume that the sign $x$ components of two consecutive pulses are both +. In this case, after a first clock pulse A, the signal at 22 is a "one" and at 24 is a "zero." Then, after the next clock pulse A, the signal at 22 is still a "one" and at 24 still a "zero" due to the sign components of the second pulse, while at 30 there is a "one" and at 32 a "zero" due to the sign components of the first pulse. Under these conditions, both gates 38 and 40 are blocked so that the output of the inverting OR gate 46 is a "one" and this constitutes one input 48 to the AND gate 50. If the above two pulses possessed, respectively, + and −$y$ components, the first pulse will be seen to have been assigned to the first phase quadrant while the second to the second phase quadrant. Under these conditions, after the second clock pulse, conductor 26 will be at "one," conductor 28 at "zero," conductor 18 at "zero" and conductor 20 at "one." The gates 42 and 44 will therefor produce outputs "-zero" and "one" to the inverting OR gate 52 so that the input on conductor 54 to the AND gate 56 is a "zero."

It will be seen that the data necessary to transmit the received data is now present at the inputs to the two AND gates 50 and 56. This is, the phase difference between the two pulses under consideration is one-phase quadrant so that the data originally transmitted was the binary word 01 belonging to the second-phase quadrant, the two bits "zero" and "one" being available at the gates 50 and 56 to transmit this word if the proper sequence is observed.

For obtaining the proper sequence, the NOR circuits 58 and 60, NAND gates 62 and 64, the J–K connected flip-flop S5 and the clock pulses B and C are employed.

For the circumstances outlined above, the conductors 26 and 30 being at "one" and the conductors 28 and 32 at "zero" after the second clock pulse A, the two AND gates 66 and 68 produce outputs so that the inverting OR gate 69 produces one input at 70 to the NAND gate 62 which is a "zero" whereas both AND gates 72 and 74 are blocked so that the inverting OR gate 76 produces one input at 78 to the NAND gate 64 which is a "one." The arrival of a clock pulse C will therefor determine which of the outputs Q or $\overline{Q}$ of the circuit S5 will be effective. Then, when a clock pulse B arrives at the device S5 a half cycle after the preceding clock pulse C, the other output of the device S5 is effective and for this purpose, the J, K inputs to the device S5 are connected to a suitable positive bias so that the device acts as a counter. In other words, the gates 34 and 36 determine the bits of the binary word to be transmitted whereas the gates 58 and 60 together with the gates 62 and 64 determine the sequence in which these bits are to be transmitted, depending upon whether the device S5 receives a "preset" or "clear" signal.

When a signal "preset" is applied to the device S5, the signal at gate 50 is transmitted first, whereas when the signal "clear" is applied to the device S5, the signal at gate 56 is transmitted first. Thus, during a clock pulse C and assuming the gate 64 to be charged with a "one" from NOR gate 60, the Q of S5 is set to "one" and if a corresponding signal is at the conductor 48, a "one" will be transmitted to the inverting OR gate 80. If a "one" is not present at the conductor 48, a "zero" is transmitted after the clock pulse C when Q=0. Then, upon arrival of the next clock pulse B, $\overline{Q}$=1 is effective which will transmit a "one" to gate 80 if a corresponding signal is present at conductor 54. If a "zero" is present at conductor 54, the second pulse is transmitted to gate 80 after the clock pulse B.

Since the CCITT logic convention is negative for "one" and vice versa, the inverting OR gate 80 is used to provide the correct logic convention at the output terminal $E_x$.

It will be appreciated that for the conditions in which the bits at the conductors 48 and 54 are both either "one" or "-zero," the sequence of bit transmission is trivial. However, when the bit at conductor 48 is a "one" or a "zero" whereas the bit at the conductor 54 is complementary thereto, the proper sequence of bit transmission is necessary to establish whether the binary word 01 or 10 is to be transmitted. It is precisely this function which the device S5 and its input logic performs.

It will be understood that the above description of the present invention is susceptible to various modifications, changes and adaptations, and the same are intended to be comprehended within the meaning and range of equivalents of the appended claims.

1. A circuit for determining the phase difference between a pair of consecutive pulses, each having two sign components relating to a quaternary phase plane, comprising, in combination:

a first pair of bistable flip-flops to which the sign components of consecutive pulses are applied, a second pair of bistable flip-flops having their inputs connected to the outputs of the first pair of bistable flip-flops, means for applying a sequence of clock pulses simultaneously to all of said bistable flip-flops, a first pair of gates, connected to produce outputs respectively in response to coincidence and noncoincidence of sign components of each consecutive pair of pulses applied to said first pair of bistable flip-flops, a second pair of gates connected for determining the coincidence and noncoincidence respectively of the outputs of said second pair of bistable flip-flops, a pair of output gates connected to receive as respective inputs thereto the outputs of said first pair of gates; and means having outputs connected as further inputs to said output gates for determining the sequence of transmission from said output gates, said means being controlled by said second pair of gates.

2. The circuit according to claim 1, wherein said means comprises a further bistable flip-flop connected as a binary counter and having the outputs of said second pair of gates connected as inputs thereto.

3. The circuit according to claim 2 further comprising means connected for delivering a first train of clock pulses to said second pair of gates for controlling the delivery of signals therefrom.

4. The circuit according to claim 3, further comprising means for controlling said further flip-flop according to a second train of clock pulses displaced by a half period with respect to said first train of clock pulses.